United States Patent [19]
Johnson

[11] 3,983,843
[45] Oct. 5, 1976

[54] AQUARIUM WATER TREATMENT APPARATUS

[76] Inventor: B. Ronald Johnson, 531 N. 500 East, Orem, Utah 84057

[22] Filed: Jan. 13, 1975

[21] Appl. No.: 540,739

[52] U.S. Cl. .................................. 119/5; 210/169
[51] Int. Cl.² .................................. A01K 63/00
[58] Field of Search .................... 119/5; 210/169

[56] References Cited
UNITED STATES PATENTS

| | | | |
|---|---|---|---|
| 3,525,435 | 8/1970 | Conner, Jr. | 210/169 |
| 3,540,593 | 11/1970 | Stewart | 210/169 |
| 3,566,840 | 3/1971 | Willinger | 119/5 |
| 3,731,090 | 5/1973 | Veloz | 119/5 |
| 3,892,199 | 7/1975 | Hugler | 119/5 |

Primary Examiner—Hugh R. Chamblee
Attorney, Agent, or Firm—H. Ross Workman; J. Winslow Young

[57] ABSTRACT

An apparatus for treating aquarium water to thereby reduce the amount of water contaminants and microorganisms harmful to the aquarium fauna. A unitary water treatment device is situated in a generally concealed location along the top of the aquarium frame and is constructed to provide an interchangeable filter and adjacent heating and sterilizing components.

13 Claims, 4 Drawing Figures

AQUARIUM WATER TREATMENT APPARATUS

BACKGROUND

1. Field of the Invention

This invention relates to aquariums and more particularly to an apparatus for treating and sterilizing aquarium water for maintaining a superior aquatic environment for the aquarium fauna.

2. The Prior Art

Aquariums, as aquatic life exhibit apparatus, have long been popular both in homes and offices by reason of the extremely wide variation of aquatic life that is possible to be displayed therein. In general, aquariums tend to be susceptible to contamination by parasites and other microorganisms which are harmful to the aquatic life, particularly fish. Also, water chemistry changes can adversely affect aquatic life.

In recognition of the problems created by the accumulation of harmful contaminants and microorganisms numerous chemical additives are commercially available to act as, for example, parasiticidal agents. Compounds are also commercially available to destroy other microorganisms within the aquarium. However, each of these chemical agents also tends to have a disruptive effect on the aquatic environment, often to the detriment of the flora and fauna therein.

To alleviate the foregoing problem, it has been customary to remove the aquatic life from the aquarium and thereafter completely replace all of the water. This solution is less than satisfactory since many of the contaminants and microorganisms are carried over into the new water supply with the returned aquatic life. The harmful microorganisms again multiply forcing a subsequent water change.

Water changes and chemical additions also inflict unnecessary risks upon the aquatic life by changes in pH, water temperature and general water chemistry.

Water treatment systems for alleviating some of the aforesaid problems are also well known. Typically, however, they require the attachment of unsightly components in full view on the side of the aquarium. Further, prior art devices which sterilize water generally treat the water exterior of the aquarium so that leaks or overflow is likely to cause damage to furniture and the like in the vicinity of the aquarium.

In view of the foregoing problems, what is needed is improved apparatus for suitably treating and sterilizing aquarium water. The apparatus should be constructed so as to continually treat a portion of the water thereby minimizing or even completely eliminating the need for periodic water changes. Treatment may also include alleviating adverse water chemistry changes. The water treatment apparatus should also, desirably, include structure for facile filtration of at least some of the water and also heating the water, if necessary, before returning the treated water to the aquarium.

The water treatment apparatus should also be readily obscured in the environment of an existing aquarium and may also desirably include apparatus for supporting a conventional aquarium light. Such an invention is disclosed herein.

BRIEF SUMMARY AND OBJECTS OF THE INVENTION

The present invention comprises a novel apparatus for sterilizing and otherwise suitably treating water from an aquarium and returning the treated water to the aquarium. The water treatment apparatus of this invention is adaptable for use in either fresh or salt water aquariums.

The apparatus is a treatment unit including a basin which is configurated to be supported obscurely above the water level in an aquarium and which provides for filtration, sterilization, and if desired heating of the aquarium water.

Preferably, the treatment unit provides for facile interchangeability of filter media as a single unit which may be confined in a contoured bag. The body of filter media may also include compounds for alleviating adverse water chemistry changes. It is also presently preferred to immerse a source of ultraviolet radiation in the flow path of water as it passes through the treatment unit to improve the degree of sterilization.

The treatment unit may also be modified to externally support a reflector and support brackets for a conventional aquarium lamp.

It is therefore and object of this invention to provide improvements in aquarium water treatment apparatus.

It is another object of this invention to provide an improved treatment unit having novel interchangeable filter media.

It is an even still further object of this invention to incorporate an ultraviolet radiation source within an enclosed chamber in the water treatment unit so as to irradiate the water flowing through the chamber and thereby sterilize at least a portion of the same.

Another valuable object is to provide a water treatment unit which does not significantly adversely affect the aesthetic appearance of an aquarium.

Another object of this invention is to provide a water treatment apparatus wherein a heater is incorporated into the apparatus to suitably heat the water prior to returning the water to the aquarium.

It is another object to control impurities of water in an aquarium.

It is another object of this invention to alleviate adverse water chemistry in an aquarium.

Another object of this invention is to provide a water treatment apparatus wherein the water directed thereto is subjected to aeration.

These and other objects and features of the present invention will become more fully apparent from the following description and appended claims taken in conjunction with the accompanying drawing.

DETAILED DESCRIPTION OF THE PREFERRED EMBODIMENTS

Figure 1:
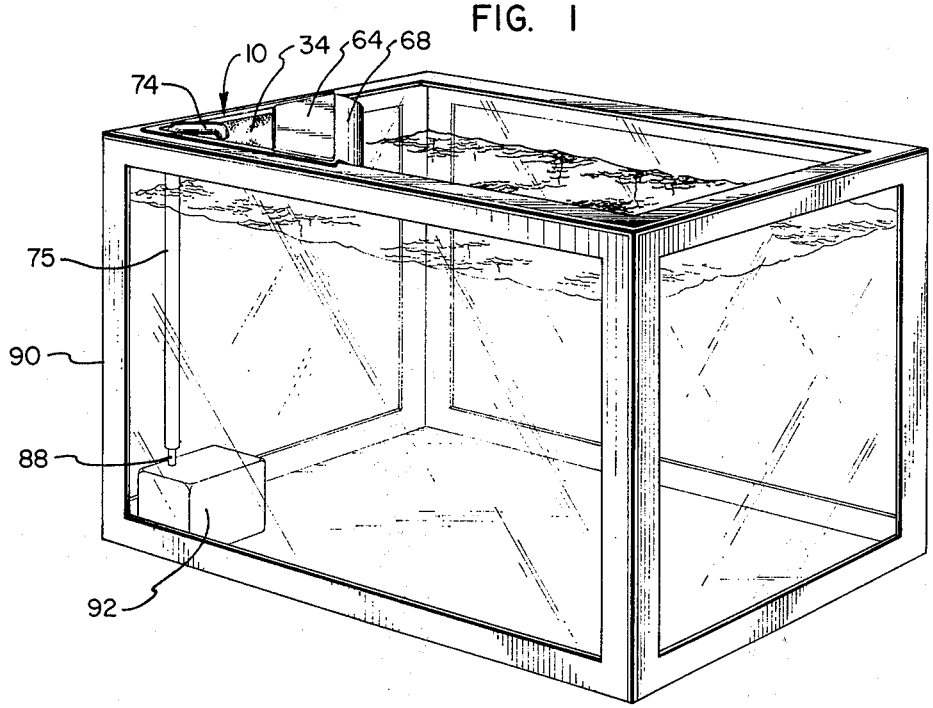
FIG. 1 is a perspective illustration of one presently preferred embodiment of this invention in the environment of an aquarium.

The invention is best understood by reference to the drawing wherein like parts are designated with like numerals throughout.

The Apparatus

Referring to FIG. 1, the preferred embodiment of the water treatment unit of this invention is shown generally at 10 in the environment of an aquarium 90.

The unit 10 is a unitary basin contoured to conform to the shape of a portion of the opening of the aquarium and has a thickness or depth not significantly greater than the width of the frame of aquarium 90. Thus, in the illustrated position, the unit is substantially concealed from view.

Figure 2:
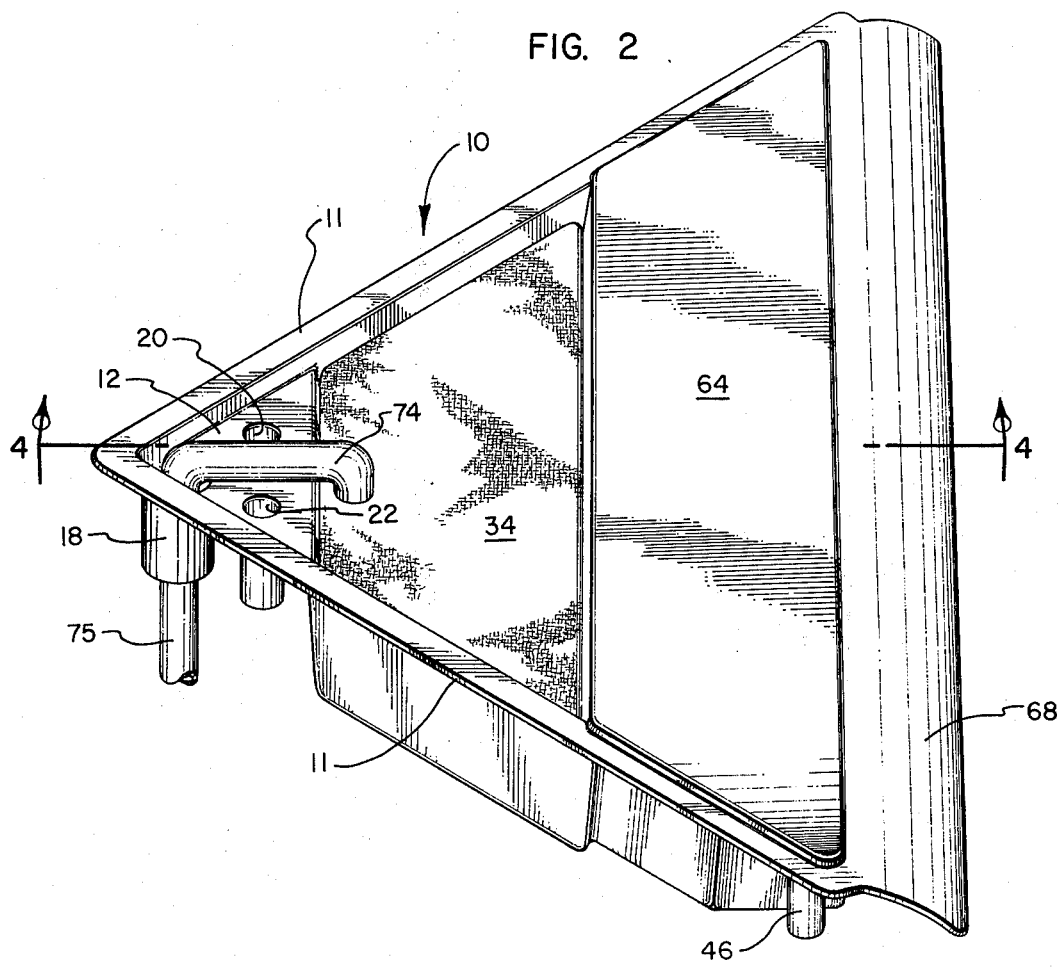
FIG. 2 is a perspective illustration of one presently preferred embodiment of the invention in its assembled form.

Referring more particularly to FIG. 2, the water treatment unit 10 includes a peripherally extending lip 11 which serves as a support for suspending the treatment unit 10 in one corner of the aquarium 90. Although the presently illustrated embodiment of this invention is shown as a triangular unit adapted to be received in one corner of an aquarium 90, clearly, other geometric configurations could be used to accommodate any desirable aquarium configuration.

Water is delivered into the basin of treatment unit 10 by any of a number of conventional means. However, in the presently illustrated embodiment, water is delivered from a conventional bubble riser 88 of a submerged filter 92 by either loosely or snugly telescopically receiving a a portion of bubble riser 88 in a length of tubing 75. If tubing 75 is loosely placed over bubble riser 88, some water may be drawn into tubing 75 directly from aquarium 90 in addition to water through filter 92.

Figure 3:
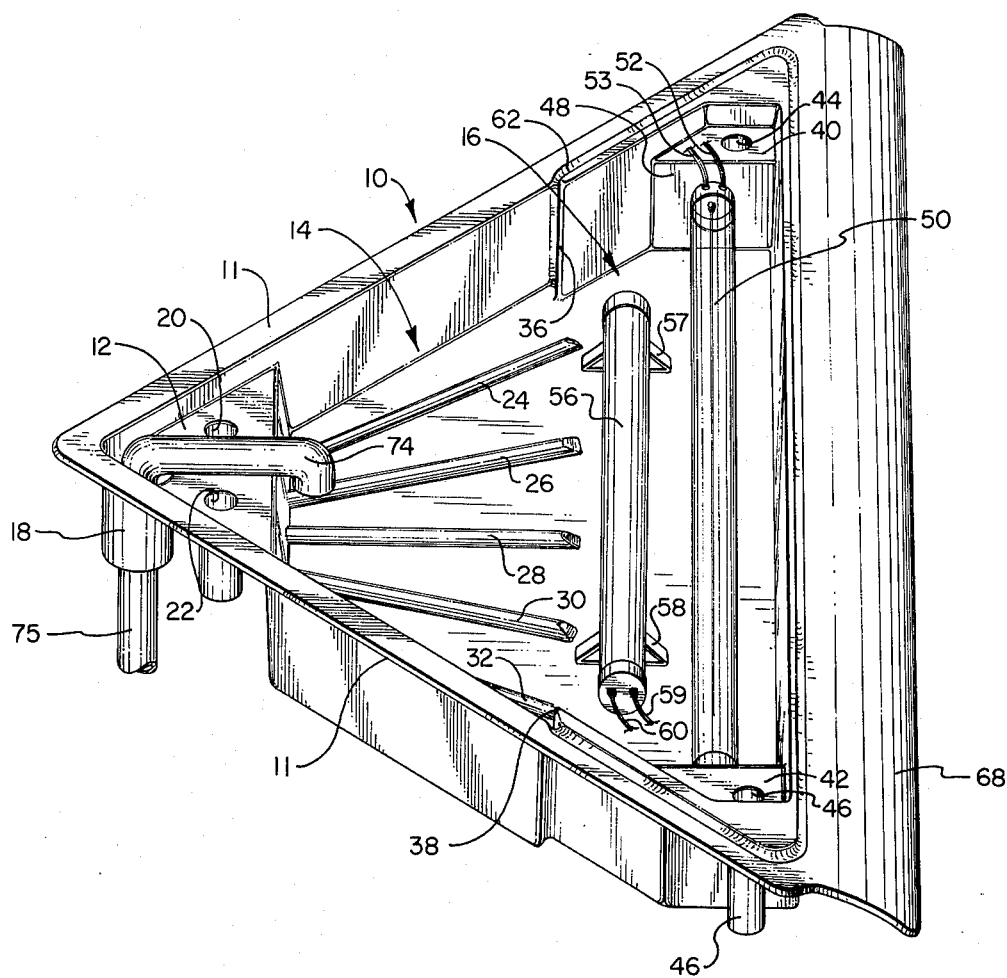
FIG. 3 is a perspective illustration of the invention of FIG. 2 with elements removed to reveal the interior of the basin.
Figure 4:
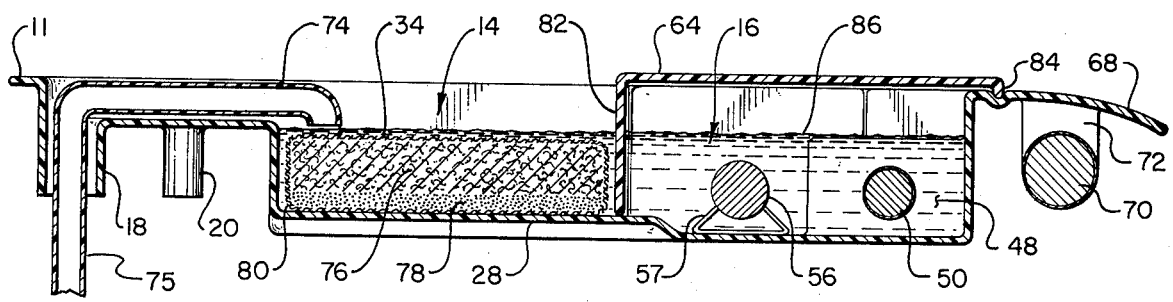
FIG. 4 is a cross-section taken along lines 4—4 of FIG. 2.

In this one preferred embodiment of the invention, one apex of the triangle shaped basin serves as an entry area for introducing the tubing 75 into a spout 74 which delivers the water into a first reservoir 14 (FIGS. 3 and 4). Tubing 75 enters through a riser 18 and terminates in a spout 74 which transversely extends across a raised platform 12. Raised platform 12 contains overflow drains 20 and 22 which serve to return water directly to the aquarium 90 in the event the water raises above the level of platform 12. The remaining segment, apart from raised platform 12 and reservoir 14, of the treatment unit 10 is covered with a cover assembly 64 so as to isolate a second reservoir 16 (FIGS. 3 and 4), more fully described hereafter.

Referring now to FIG. 3, the treatment unit 10 of FIG. 2 is shown with the exception that the filter medium 34 and the cover 64 have been removed therefrom exposing the interior of treatment unit 10. The filter medium 34 (FIG. 2) is contained in the first reservoir 14 and is supported above the bottom of the reservoir upon a plurality of of ridges 24, 26, 28, 30 and 32, respectively. In this manner, water passing through or around the filter medium 34 is allowed to pass underneath the filter medium 34 in the spaces between the foregoing ridges and thereafter enter the second reservoir 16.

Filter medium 34 (best shown in FIG. 4) is fabricated as a unitary body and includes an underlying layer 78, preferably including activated carbon or charcoal granules and/or compounds which alleviate adverse water chemistry changes, and an overlayer of fibrous filter medium 76 which may be prepared from conventional filter mediums such as Dacron, glass wool, or foams. The entire structure is confined or otherwise encapsulated by a surrounding porous sheet material or fabric 80 which serves to hold all of the components of filter medium 34 as a unitary body. As a unitary body, filter medium 34 may be desirably fabricated so as to render the filter medium 34 readily replaceable.

A second preferred embodiment for filter medium 34 is easily prepared using a batt of non-woven fibrous Dacron filter medium overlying a layer of charcoal, etc., granules as in the first embodiment. The layer of granules is held against the Dacron batt by a piece of Dacron cloth which has been heat bonded along its periphery to the Dacron batt.

A third embodiment for filter medium 34 may include a layer of impregnated foam material wherein the foam has been impregnated with activated charcoal and/or conventional materials which alleviate adverse water chemistry conditions. The foam may also be heat or solvent bonded along a juxtaposed periphery to the Dacron batt.

The water emerging from the first reservoir 14 passes between ridges 24, 26, 28, 30 and 32 into the second reservoir 16. Second reservoir 16 is isolated by cover 64. The cover 64 has a skirt 82 supported above the bottom of the unit 10 by each of the respective ridges which extend into reservoir 16 beyond a line transecting the treatment unit 10 between flanges 36 and 38.

The skirt 82 of cover 64 (FIGS. 2 and 4) is held between flanges 36 and 38. Cover 64 (FIG. 2) also has a downwardly extending lip 84 which nests within a groove 62 extending around a portion of the outer periphery of reservoir 16. Cover 64 is securely held in position on the treatment unit 10 by the cooperation between lip 84 and groove 62 and by engagement of skirt 82 between flanges 36 and 38.

Cover 64 may also dispense with lip 84 and have a flat periphery which nests within a countersunk shelf or lap joint around the upper portion of the outer walls of reservoir 16.

Cover 64 may further be extended to completely enclose all of treatment unit 10. The extended cover may either incorporate therein skirt 82, however, skirt 82 may, preferably, be separately incorporated into treatment unit 10 as the divider between reservoirs 14 and 16.

Reservoir 16 is particularly adapted to receive an ultraviolet lamp assembly 50 in press fit relationship between an abutment surface 48 and a corresponding abutment surface (not shown) at the other end of the reservoir 16. For example, a suitable ultraviolet lamp assembly 50, including the electrical leads 52 and 53 may be manufactured according to the method of my patent for Non-corrosive Aquarium Lamp Assembly, U.S. Pat. No. 3,849,700, issued Nov. 19, 1974.

Regardless of the method of manufacture, lamp assembly 50 must be fabricated so as to render the lamp assembly 50 immersible in water. Although an ultraviolet radiation source is specifically set forth herein, any suitable device for sterilizing at least a portion of the water passing through treatment unit 10 may be advantageously utilized therein.

By preferentially adjusting the distance between the abutment surface 48 and the corresponding opposing abutment surface (not shown) it is possible to snugly engage ultraviolet lamp assembly 50 in a press fit relationship and thereby hold the normally buoyant lamp assembly 50 in a submerged position in the water. If desired mounting brackets could be used. However, the preferred method of assembly is inexpensive and readily permits the replacement of a burned out lamp assembly 50.

Reservoir 16 may include a heater element 56 supported on brackets 57 and 58 and receiving electrical power through electrical leads 59 and 60. The heater 56 may be any of a number conventional aquarium heaters which are susceptible of being immersed horizontally in a body of water.

Return drains 44 and 46 are provided in raised surfaces 40 and 42, respectively, the raised surfaces 40 and 42 serving to establish the water level 86 (FIG. 4) in reservoir 16. Excess water is returned to the aquarium 90 through the return drains 40 and 46.

Referring now to FIG. 4, water level 86 is more clearly demonstrated as well as the positions of heater 56 and ultraviolet radiation source 50. In addition, the interior of the filter medium 34 is more clearly set forth.

An extension may be incorporated into the treatment unit 10 as a reflector 68 having suspended therefrom a bracket 72 supporting a conventional aquarium light 70. Bracket 72 may also be horizontally oriented by extension from the outer wall of reservoir 16. Aquarium light 70 may also be fabricated according to my foregoing U.S. Pat. No. 3,849,700.

The Operation

In operation, the treatment unit 10 is suspended over the water of aquarium 90 by placing lip 11 along an upper edge of the aquarium with the treatment unit 10 snugly fitted into one corner of aquarium 90.

A water inflow tube 75 is suitably connected with a conventional bubble riser 88 or other water-moving apparatus. The aquarium water is thereafter directed through spout 74 onto the filter medium 34. At least a portion of the water passes through the fibrous filter medium 76 and the granule layer 78 of activated charcoal or carbon and/or materials which alleviate adverse water chemistry conditions. From filter medium, water exits downwardly between the plurality of ridges 24, 26, 28, 30 and 32. The filtered water thereafter passes underneath skirt 82 of cover 64 into reservoir 16. The remainder of the water either overflows through overflow drains 20 and 22 or bypasses filter medium 34 through the spaces surrounding the filter medium 34 and enters the reservoir 16 along the same path as the water which passed through filter medium 34. However, all water eventually entering reservoir 16 may be forced to pass through filter medium 34 by configurating filter medium 34 so as to snugly fit within reservoir 14.

Upon entering reservoir 16, a portion of the water is sterilized by exposure to ultraviolet radiation emitted by the ultraviolet lamp 50, the radiation serving to alleviate microorganism contamination. The water then flows through at least one of the return drains 44 and 46. Selectively, the water may also be suitably heated by a heater 56.

It should also be noted in reference to this invention that increased aeration of the water is provided by the large surface areas exposed during the treating and return flow steps.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by a United States Letters Patent is:

1. A water treatment unit for an aquarium comprising:
    a unitary basin comprising a first reservoir in direct fluid communication with a second reservoir and means within the first reservoir for holding a unitary body of filter material for filtering at least a portion of water entering the basin and means within the second reservoir for sterilizing at least a portion of the water in the basin;
    means for suspending the basin over water in an aquarium;
    means for delivering water to the filter material in the first reservoir, the water passing to the second reservoir and means for returning water from the second reservoir to the aquarium.

2. A water treatment unit as defined in claim 1 wherein the unitary body of filter material comprises a first layer of charcoal filter medium overlayed by a second layer of fibrous filter medium, both the first and second filter mediums being completely encapsulated as a unitary body by a porous sheet material.

3. A water treatment unit as defined in claim 2 wherein the fibrous filter medium is selected from the group consisting of Dacron, glass wool and foam.

4. A water treatment unit as defined in claim 2 wherein the body of filter material is dimensionally configurated so as to be less than the dimensions of the first reservoir.

5. A water treatment unit as defined in claim 1 wherein the body of filter material comprises a first layer of fibrous filter medium and a second layer including at least one selected from the group consisting of activated charcoal, granules of activated carbon, and materials for alleviating adverse water chemistry conditions, the second layer being held to the first layer by a sheet of fabric encapsulating the second layer and bonded along its periphery to the first layer.

6. A water treatment unit as defined in claim 1 wherein the body of filter material comprises a first layer of fibrous filter medium and a second layer of foam filter medium, the second layer being impregnated with materials for alleviating adverse water chemistry conditions, the first and second layers being bonded together.

7. A water treatment unit as defined in claim 1 wherein the second reservoir includes means for holding in a submerged position in the water an ultraviolet radiation source as the sterilizing means.

8. A water treatment unit for an aquarium comprising:
    a unitary basin comprising means within the basin for holding a body of filter material for filtering at least a portion of water entering the basin and means within the basin for sterilizing at least a portion of the water in the basin and wherein the sterilizing means is isolated within the basin by a cover, the cover having a skirt extending downwardly into the basin and transecting the basin, the skirt permitting water to flow underneath the skirt from a first reservoir into a second reservoir;
    means for suspending the basin over water in an aquarium; and
    means for delivering water to the basin and means for returning water from the basin to the aquarium.

9. A water treatment unit for an aquarium comprising:
- a unitary basin comprising a first reservoir in direct fluid communication with a second reservoir and means within the first reservoir for holding a unitary body of filter material for filtering at least a portion of water entering the basin and means within the second reservoir for sterilizing at least a portion of the water in the basin;
- means for suspending the basin over water in an aquarium comprising a lip extending outwardly around the upper periphery of the basin, the lip serving to support the basin upon the upper edge of an aquarium in suspension above the water in the aquarium, the unit being configured to be partially concealed by a framework of the aquarium; and
- means for delivering water to the filter material in the first reservoir, the water passing to the second reservoir and means for returning water from the second reservoir to the aquarium.

10. A water treatment unit as defined in claim 9 wherein the lip along one edge of the basin extends a greater distance than the lip along the other edges and thereby serves as a reflector for an aquarium lamp.

11. A water treatment unit for an aquarium comprising:
- a unitary basin, the basin being adapted to be supported in the upper portion of the aquarium above the water level in the aquarium, the basin comprising:
  - a first reservoir, the first reservoir receiving a body of filter material so as to filter at least a portion of the water entering the first reservoir from the aquarium; and
  - a second reservoir in fluid communication with the first reservoir, the second reservoir being enclosable by a cover to create an enclosed chamber, the cover having a skirt extending downwardly into the basin, the skirt separating the second reservoir from the first reservoir with water passing below the skirt from the first reservoir to the second reservoir;
- water inlet means for supplying water from the aquarium to the first reservoir;
- an ultraviolet radiation source submerged below the water level in the second reservoir;
- means for supplying electrical power to the ultraviolet radiation source; and
- means for maintaining a fixed water level in the second reservoir and returning overflow from the second reservoir to the aquarium.

12. A unitary, replaceable filter element for an aquarium water treatment unit comprising:
- a first layer of fibrous filter medium; and
- a second layer attached to the first layer to form a unitary, replaceable filter element, the second layer including a water treatment material selected from the group consisting of activated charcoal, activated carbon, and a material which alleviates an adverse water chemistry condition in an aquarium.

13. A replaceable filter for an aquarium water treatment unit as defined in claim 12 wherein the water treatment material of the second layer is impregnated into a foam material to form the second layer.

* * * * *